Nov. 8, 1955
E. E. FRISK
2,722,978
SCREEN WINDOW FOR VEHICLES
Filed Oct. 15, 1952
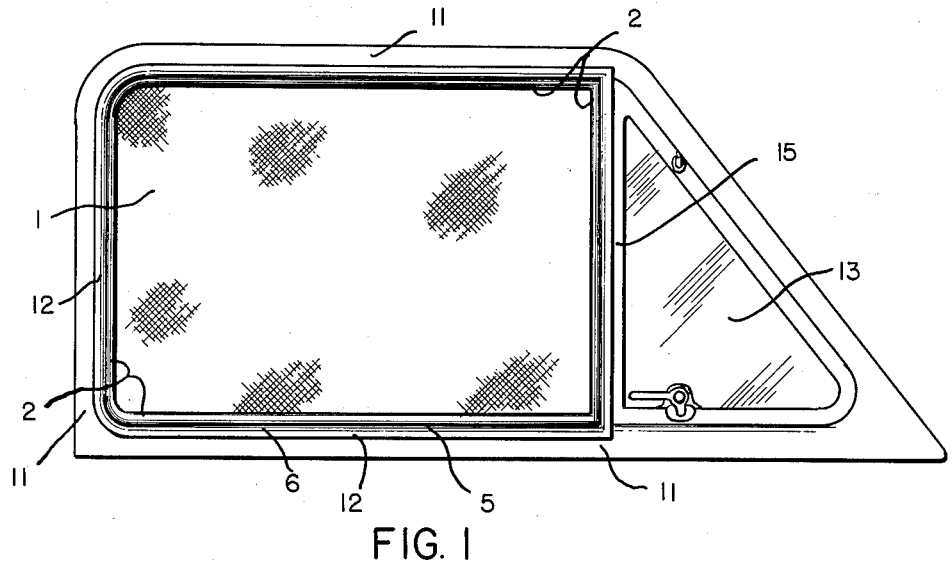
FIG. 1
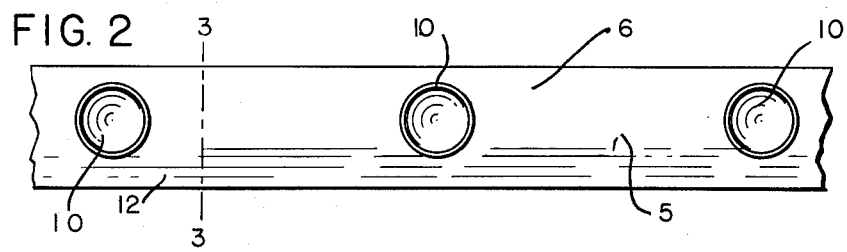
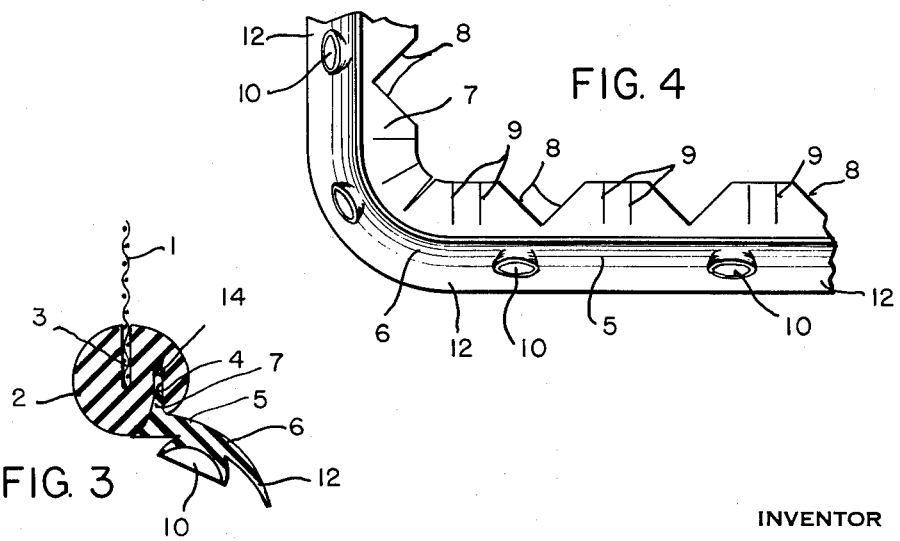
INVENTOR
ERIK E. FRISK
BY
Richard P. Cardew
Agent

United States Patent Office 2,722,978
Patented Nov. 8, 1955

2,722,978
SCREEN WINDOW FOR VEHICLES
Erik E. Frisk, Duluth, Minn.
Application October 15, 1952, Serial No. 314,875
2 Claims. (Cl. 160—40)

This invention relates to a screen window for use on automobiles and while there have been many such devices made and patented, they, for the most part, are made to be carried in the grooves or channels in which the sliding window glass panel rides. The instant invention has special reference to a window screen which is independent of the sliding window of the vehicle and does not interfere with the operation of the sliding window at all.

The prior devices have not come into common use, as is well known, for they are expensive to manufacture and are not entirely satisfactory because of the fact that they must be removed each time one wants to close the window. Many of these devices are difficult to remove because they have a rigid frame surrounding the screen or mesh material to support the latter.

It is therefor, one of the principal objects of the instant invention to provide a simple and efficient screen for use in automobile windows and the like which will permit the windows being raised and lowered without removing the screen.

Another object is to provide a screen window which will fit in place firmly and to provide a sealing means to prevent any openings along the edges of the device through which insects or the like may enter the vehicle.

Another object is to provide such a screen window which may be left in place in a car window to permit air circulation within the car when the car is left in the sun during warmer months of the year.

Another object is to provide such a screen which has a very flexible or resilient frame whereby same may be rolled to permit its being packaged or stored conveniently.

Another object is to provide such a device which uses inexpensive parts in its manufacture, which is simple to assemble, and will be low in its selling price.

Another, more specific object is to provide such a device which is composed of three major parts or pieces: a screen of predetermined form, a frame member of substantially circular cross section mounted on the screen and having a slot therein to receive the third or fastening and securing member thereof, the frame member being of resilient material bent and secured around the edges of the screen, and the fastening member being of resilient material and having means whereby it may be readily shaped to the contour of the frame and secured to the frame in such a way that the screen may be mounted on the so-called garnished moulding on a vehicle window, on the inside thereof.

These and other objects and advantages of my invention will become more apparent as the description proceeds:

In the accompanying drawing forming a part of this application:

Fig. 1 is a side elevational view of my invention.

Fig. 2 is a bottom plan view of the securing strip or member.

Fig. 3 is a vertical sectional view on the line 3—3 of Fig. 2.

Fig. 4 is a side elevational view of Fig. 3 with the frame removed.

In the drawing, the reference numeral 1 indicates the reticulate or screen member of my device, which may be any suitable mesh metal or plastic screen material and is cut to any desired predetermined shape to fit a given vehicle window.

A frame 2 of rubber, preferably so-called sponge-rubber, is provided around the screen member, the edges of the screen being imbedded in the frame 2, as shown. The frame 2 is preferably of substantially circular cross section, as shown, and has a slit 3 longitudinally therein to receive the edges of the screen. The rubber is either cemented or vulcanized together after the screen is in the slit to hold the frame on the screen member securely. The rim or frame 2 is of circular cross section so that it can and will bend readily to the contour of the screen member without buckling or kinking. The frame 2 of resilient material entirely surrounds the screen member 1, as shown.

The resilient frame member 2 is provided with a second longitudinal slot or groove 4 along its entire length, the groove 4 being open on the opposite side of the member 2 from the screen member whereby the slit 3 and groove 4 are in spaced substantially parallel relationship to each other, as shown.

As is deemed apparent, the frame 2 does not rigidify the screen member. It does, however, provide a means for installing the fastening or securing strip or member 5 to the screen in a most simple, convenient, and efficient manner.

The strip or member 5 is also made of resilient rubber material, but not of sponge rubber. The rubber of this strip must be of a finer texture, as will become apparent. The member 5 is elongated and has a thin body portion 6 of arcuate or concavo-convex shape in cross section, as shown. On the convex surface of the body portion 6 and adjacent one longitudinal edge thereof an upstanding flange or rib 7 is provided, the rib being relatively thin and extending normal to the body portion as shown throughout its length.

The rib 7 provides the means for securing the fastening or mounting strip or member 5 onto the framed screen. The rib is fitted into the slot or groove 4 and cemented or vulcanized in place, after the frame 2 is secured to the screen, at least by cementing, and is preferably provided with regularly spaced V-shaped notches 8 and/or slits 9 transversely therethrough to facilitate its being bent or flexed to follow the contour of the frame 2 around the screen member, it being noted that the rib 7 extends into the slot or groove 4 in a direction substantially parallel with the plane of the screen member and must fold and separate in a manner not readily accomplished with a thin strip of material, such as the rib. The notches 8 and slits 9 make the installation of the member 5 on the frame 2 a simple operation whereby the cost of manufacture will not be high, nor the assembly problem difficult.

On the concave side of the body portion 6 I have provided a plurality of suction cups 10—10 in spaced relation to each other, they being preferably moulded integral with the body portion and rib, of course. The suction cups serve as the means for attaching or securing the complete screen device in place on the garnish moulding 11 of the car or vehicle window, the attachment being at spaced intervals about the window garnish moulding, of course.

The body portion 6 of the member 5 has the inside edge 12 thereof extending beyond the edges of the suction cups, and, because of the arcuate shape of the body portion 6, this extending inner edge 12 forms a sealing flap entirely around the window and prevents insects from entering the vehicle between the suction cups by engaging the garnish moulding entirely around the window opening, as shown.

Obviously, the instant device will fit windows of slightly varying sizes if desired for the resilient frame surrounding the screen and the suction cups and sealing flap will give and bend readily to accomplish same.

The device as above described contemplates a window not having a no-draft window 13 as shown in Fig. 1. In the form of the invention shown in Fig. 1, it is desirable to permit the operation of the no-draft window which pivots on a vertical axis. In order to accomplish this purpose, I provide a stiff wire or rod 14 longitudinally of the frame member 2 in the slot or groove 4 along the rear edge 15 of the no-draft window. This wire stiffener serves to hold that portion of the frame adjacent the edge 15 of the window 13 rigid so that it may be securely held in place by the suction cups on the adjacent angularly disposed edges of the frame 2, as shown in Fig. 1.

Obviously, the instant device will not interfere with the raising or lowering of a window and any desired window opening may be employed with my screens in place on a vehicle to suit weather conditions as well as individual choice. Also, the screens need not be removed over extended periods of time and use even though rainy weather or periods of dead storage occur. Thus, it is deemed apparent that the instant screens are very convenient and handy to use and least annoying to handle and operate.

Having thus described my invention, what I claim is:

1. A window screen for a vehicle having a window opening and a garnish moulding surrounding same consisting of: a screen member of predetermined shape to substantially fit the contour of said moulding, a rubber frame fixed around the outer edges of said screen member, said frame having a longitudinal groove therein along the surface thereof away from said screen, a mounting member, a rib on said mounting member engaged and secured in said groove to hold said mounting member in place on said frame, a plurality of small suction cups on said mounting member to secure same to said moulding for holding said screen in place thereon, and a sealing flap surrounding said cups for engaging said moulding to seal any openings between said moulding and said screen.

2. A window screen for a vehicle having a window opening and a garnish moulding surrounding same consisting of, a screen member shaped to substantially the contour of said moulding, a resilient frame fixed around the outer edges of said screen, said frame having a longitudinal groove therein along the edge thereof opposite said screen, and a mounting member, said mounting member comprising a body portion of substantially concavo-convex form in cross section, a rib on the convex side of said body portion inserted into said groove for securing said mounting member to said frame, and suction cups on the concave side of said body portion to secure said screen in place on said moulding, said body portion extending over said cups and forming a sealing flap to close any openings between said screen and said moulding.

References Cited in the file of this patent

UNITED STATES PATENTS

| | | |
|---|---|---|
| 1,630,208 | Norbeck | May 24, 1927 |
| 1,902,888 | Paquette | Mar. 28, 1933 |
| 2,092,914 | Griest | Sept. 14, 1937 |
| 2,612,947 | Jenks | Oct. 7, 1952 |